US008630579B2

(12) United States Patent
Horiuchi et al.

(10) Patent No.: US 8,630,579 B2
(45) Date of Patent: Jan. 14, 2014

(54) WIRELESS COMMUNICATION APPARATUS, WIRELESS COMMUNICATION METHOD, AND WIRELESS COMMUNICATION SYSTEM

(75) Inventors: Ayako Horiuchi, Kanagawa (JP); Seigo Nakao, Kanagawa (JP); Yoshiko Saito, Kanagawa (JP); Katsuhiko Hiramatsu, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 637 days.

(21) Appl. No.: 12/933,056

(22) PCT Filed: Mar. 17, 2009

(86) PCT No.: PCT/JP2009/001183
§ 371 (c)(1),
(2), (4) Date: Sep. 16, 2010

(87) PCT Pub. No.: WO2009/116270
PCT Pub. Date: Sep. 24, 2009

(65) Prior Publication Data
US 2011/0009052 A1 Jan. 13, 2011

(30) Foreign Application Priority Data
Mar. 18, 2008 (JP) ................................. 2008-070271

(51) Int. Cl.
*H04B 3/36* (2006.01)
(52) U.S. Cl.
USPC .............................................. 455/7; 370/315
(58) Field of Classification Search
USPC ................. 455/7–11.1, 14–25; 370/315
See application file for complete search history.

(56) References Cited

U.S. PATENT DOCUMENTS

| 2006/0146856 A1* | 7/2006 | Jung et al. ..................... 370/431 |
| 2007/0086387 A1 | 4/2007 | Kang |
| 2008/0192872 A1* | 8/2008 | Lindoff ......................... 375/355 |
| 2009/0233544 A1* | 9/2009 | Oyman et al. ................... 455/7 |

FOREIGN PATENT DOCUMENTS

| JP | 2003-188806 | 7/2003 |
| JP | 2007-116697 | 5/2007 |

OTHER PUBLICATIONS

International Search Report dated Jun. 23, 2009.
"Proposal for IEEE 802.16m Frame Structure for Single Band Operation," IEEE 802.16 Broadband Wireless Access Working Group, Jan. 2008, pp. 1-7.
"MS handover in transparent RS and non-transparent RS coexisting multi-hop relay network," IEEE 802.16 Broadband Wireless Access Working Group, Mar. 2007, pp. 0-2.

* cited by examiner

*Primary Examiner* — Raymond Dean
(74) *Attorney, Agent, or Firm* — Dickinson Wright PLLC (57) ABSTRACT

A wireless communication apparatus, method, and system selectively utilize advantages of both centralized control and distributed control while suppressing cell searching time. FIG. 4(*a*) represents an example in which a P-BCH (Primary Broadcast Channel) and an S-SCH (Secondary Synchronization Channel) for centralized control and a P-BCH and an S-SCH for distributed control are frequency-divided, and the P-BCH and the S-SCH for the distributed control are transmitted to a distributed control resource. FIG. 4(*b*) represents an example in which a P-BCH and an S-SCH for the centralized control and a P-BCH and an S-SCH for the distributed control are time-divided, and the P-BCH and the S-SCH for the distributed control are transmitted to a centralized control resource. Since a relay station transmits the P-SCH (Primary Synchronization Channel) as a centralized control resource, a mobile station can specify sub-frame timing by using only the centralized control resource.

2 Claims, 10 Drawing Sheets

WIRELESS COMMUNICATION APPARATUS, WIRELESS COMMUNICATION METHOD, AND WIRELESS COMMUNICATION SYSTEM

TECHNICAL FIELD

The present invention relates to a wireless communication apparatus, a wireless communication method, and a wireless communication system that relay communication between a base station and a mobile station.

BACKGROUND ART

Recently, in cellular mobile communication systems, transmission of large-capacity data not only audio data but also still image data, moving image data, and the like is generally performed in accordance with implementation of information in multimedia. In order to implement the transmission of large-capacity data, technologies for realizing a high transmission rate by using a high-frequency wireless band are actively reviewed.

However, when a high-frequency wireless band is used, a high transmission rate can be expected in a short distance. However, as the distance becomes longer, the attenuation according to a transmission distance increases. Accordingly, when a mobile communication system using a high-frequency wireless band is practically operated, the coverage area of a wireless communication base station apparatus (hereinafter, abbreviated as a base station) is decreased. Therefore, more base stations need to be installed. In order to install the base station, corresponding costs occur. Accordingly, technology for realizing communication services using a high-frequency wireless band with an increase in the number of the base stations being suppressed is strongly demanded.

Figure 1:
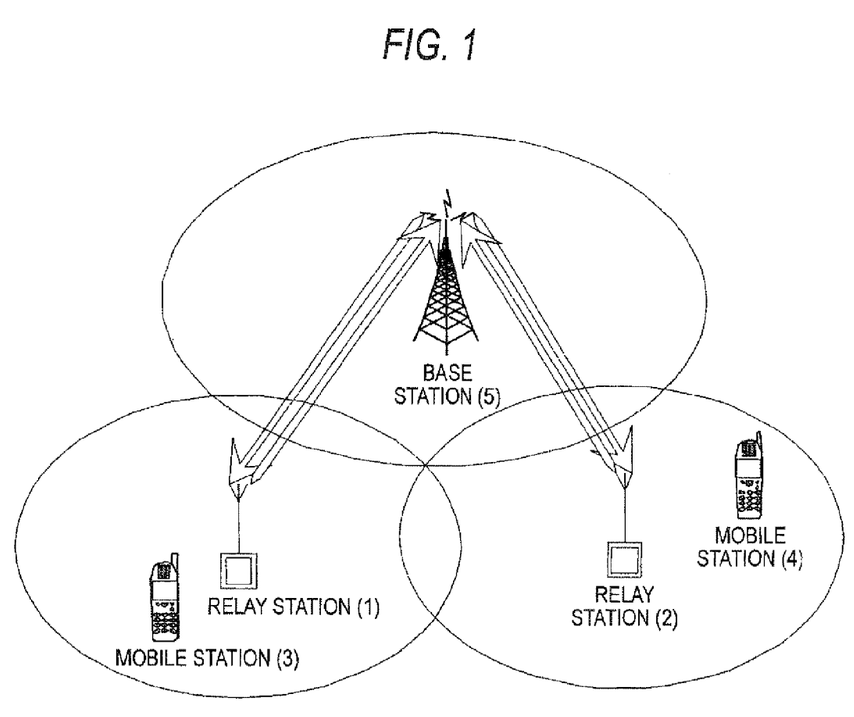
FIG. 1 is an explanatory diagram of a system that performed relay transmission.

For such a demand, in order to increase the coverage area of each base station, as represented in FIG. 1, relay transmission technologies in which wireless communication relay station apparatuses 1 and 2 (hereinafter, abbreviated as relay stations) are installed between the base station 5 and wireless communication mobile station apparatuses 3 and 4 (hereinafter, abbreviated as mobile stations), and communication between the base station 5 and the mobile stations 3 and 4 is performed through the relay stations 1 and 2 are reviewed. When the relay technology is used, terminals 3 and 4 that cannot directly communicate with the base station 5 can communicate through the relay stations 1 and 2.

As methods of controlling the relay stations and the mobile stations, there are centralized control and autonomous distributed control. The centralized control is a method in which the base station 5 manages all the resources between the relay stations 1 and 2 and the base station 5, between the relay stations 1 and 2 and the mobile stations 3 and 4, and the base station 5 generates control information and controls allocation thereof. The autonomous distributed control is a method in which the relay station 1 manages the resources of the mobile station 3 connected to the relay station 1, the relay station 2 manages the resources of the mobile station 4 connected to the relay station 2, and the relay stations 1 and 2 generate control information and controls the allocation thereof.

The centralized control can flexibly change the amount of allocation in accordance with a change in the traffics of the relay stations 1 and 2. In addition, in the centralized control, cooperative relay that is simultaneously relayed by a plurality of relay stations 1 and 2 can be implemented in an easy manner. On the other hand, in the distributed control, the amount of allocation can be changed in accordance with an instant SINR (Signal-to-Interference plus Noise power Ratio) between the relay stations 1 and 2 and the mobile stations 3 and 4. In addition, the distributed control can decrease the scheduling load of the base station 5. In Non Patent Citation 1, a system in which a system performing centralized control and a system performing distributed control coexist is proposed.

[Non Patent Citation 1] IEEE 802.16 Broadband Wireless Access Working Group IEEE C802.16j-07/247MS handover in transparent RS and non-transparent RS coexisting multi-hop relay network

DISCLOSURE OF INVENTION

Technical Problem

As described above, in the conventional centralized control, the base station schedules all the resources. Accordingly, when viewed from the mobile station, all the cells are viewed as the same. Thus, according to the centralized control, there are advantages in that a change in the traffic of each relay station can be responded in an easy manner, and cooperative relay can be implemented. However, the scheduling load of the base station is increased.

On the other hand, in the distributed control, the relay station schedules for mobile stations inside the relay station. Accordingly, from the mobile stations, all the cells are differently viewed. Thus, according to the distributed control, there are advantages in that there is responsiveness for an instant SINR, and the scheduling load of the base station can be reduced. However, it is difficult to implement cooperative relay and respond to the change in the traffic for each relay station.

In addition, in Non Patent Citation 1, technology in which the centralized control or the distributed control is performed for each of the relay stations 1 and 2 is disclosed. However, one relay station cannot simultaneously perform the centralized control and the distributed control. Furthermore, there are mobile stations that are appropriate for the centralized control and mobile stations that are appropriate for the distributed control. However, the use thereof cannot be separated.

Thus, in order to simultaneously utilize the advantages of the centralized control and the distributed control, a configuration in which both resources that are controlled in a concentrated manner (centralized control resource) and a resource that are controlled in a distributed manner (distributed control resource) are set, and both types of the resources are recognized as different cells by the mobile stations 3 and 4 may be considered.

However, in a case where resources are allocated to both the centralized control and the distributed control and are recognized as different cells by the mobile stations 3 and 4, cell searching is required to be performed for a plurality of cells even when there is only one relay station for the relay. Accordingly, a time is needed for the cell searching.

The present invention is contrived in consideration of the above-described situations. The object of the present invention is to provide a wireless communication apparatus, a wireless communication method, and a wireless communication system capable of selectively utilizing the advantages of both centralized control and distributed control while a time needed for cell searching is suppressed.

Technical Solution

According to the present invention, regarding a relay station that relays resources controlled in a concentrating manner (centralized control resources) and resources controller in a distributing manner (distributed control resources), the relay station transmits a P-BCH and an S-SCH for centralized control and a P-BCH and an S-SCH for distributed control and transmits the P-SCH to a centralized control resource.

According to the above-described configuration, the band in which the P-SCH is transmitted can be reduced. In addition, when cell searching is performed, the band for which the P-SCH is to be searched can be limited to the centralized control resources.

In addition, according to the present invention, in a case where the centralized control resource and the distributed control resource are frequency-divided, the P-BCH and the S-SCH for the centralized control resource and the P-BCH and the S-SCH for the distributed control resource are transmitted to the centralized control resource and the distributed control resource.

According to the above-described configuration, when the cell searching is performed, the resource that receives the S-SCH can be determined as a connectable resource. In addition, the reception quality of the connectable resource can be reported.

In addition, according to the present invention, all the P-BCH and the S-SCH for the centralized control resource and the P-BCH and the S-SCH for the distributed control resource are transmitted to a centralized control frequency resource and are divided into a time resources.

According to the above-described configuration, the resources that are received when the cell searching is performed can be limited to the frequency resources of the centralized control.

In addition, according to the present invention, a scrambling code used as the S-SCH for the distributed control is calculated from a scrambling code used for the S-SCH for the centralized control and an index a that represents a distance between the resource to which the S-SCH for the distributed control is transmitted and the resource to which the S-SCH for the centralized control is transmitted.

According to the above-described configuration, when the S-SCH for the distributed control is detected, the correlation can be acquired without searching for the scrambling code.

In addition, according to the present invention, in a case where the centralized control resource and the distributed control resource are time-divided, the P-BCH and the S-SCH for the centralized control are periodically transmitted even when the distributed control resource is allocated.

According to the above-described configuration, even when the allocation between the centralized control resource and the distributed control resource is changed, the P-BCH and the S-SCH for the centralized control can be periodically received. Accordingly, the cell searching can be periodically performed.

In addition, a wireless communication apparatus according to the present invention relays communication between a base station and a mobile station that performs symbol synchronization by using a P-SCH, performs frame synchronization by using a S-SCH, and receives and demodulates/decodes a P-BCH at the time of cell searching, by using a centralized control resource and a distributed control resource, and the P-BCH, the S-SCH, and the P-SCH for the centralized control are transmitted to the centralized control resource, and the P-BCH and the S-SCH for the distributed control are transmitted to the distributed control resource.

According to the above-described configuration, by limiting the transmission of the P-SCH to the centralized control resource, the frequency for which the P-SCH is searched can be limited to the centralized control frequency at the initial period of the cell searching. Accordingly, the timing synchronization can be specified in an easy manner, and the cell search for both the centralized control resource and the distributed control resource can be performed in an easy manner. Therefore, while a time needed for the cell searching is suppressed, advantages of both the centralized control and the distributed control can be selectively utilized.

In addition, a wireless communication apparatus according to the present invention, in a case where the centralized control resource and the distributed control resource are frequency-divided, transmits the P-BCH and the S-SCH for the centralized control to the centralized control resource, and transmits the P-BCH and the S-SCH for the distributed control to the distributed control resource.

According to the above-described configuration, when the cell searching is performed, the resource that receives the S-SCH can be determined as a connectable resource. In addition, the reception quality of the connectable resource can be reported.

In addition, a wireless communication apparatus according to the present invention, in a case where the centralized control resource and the distributed control resource are frequency-divided, transmits the P-BCH and the S-SCH for the centralized control and the P-BCH and the S-SCH for the distributed control to the centralized control resource in a time divisional process.

According to the above-described configuration, the resources that are received when the cell searching is performed can be limited to the frequency resources of the centralized control. In addition, in a case where the S-SCH of the cell controlled to be distributed in the time-axis direction is searched, the cell group ID for which a correlation process is performed can be changed in accordance with the deviation in the time-axis direction. Therefore, the amount of correlation calculation can be decreased.

In addition, a wireless communication apparatus according to the present invention calculates a scrambling code used in the S-SCH for the distributed control from a scrambling code used for the S-SCH for the centralized control and an index a that represents a distance between the resource to which the S-SCH for the distributed control is transmitted and the resource to which the S-SCH for the centralized control is transmitted.

According to the above-described configuration, when the S-SCH for the distributed control is detected, the correlation can be acquired without searching for the scrambling code. In addition, the mobile station can specify the group IDs for the distributed control resources that are deviated in the frequency direction by specifying the cell group ID of the centralized control resource. Therefore, the amount of correlation calculation of the S-SCH can be reduced.

In addition, a wireless communication apparatus according to the present invention, in a case where the centralized control resource and the distributed control resource are time-divided, the P-BCH and the S-SCH for the centralized control are periodically transmitted regardless of a time when any one of the distributed control resource and the centralized control resource is allocated or not.

According to the above-described configuration, the P-SCH, the S-SCH, the RS, and the P-BCH for centralized control are periodically transmitted. Thus, even in a case where the centralized control resource is allocated on the time axis, the P-BCH, the S-SCH, and the P-BCH can be periodically received. Accordingly, the mobile station that performs cell searching can perform correlation calculation in an easy manner.

In addition, a wireless communication method according to the present invention is a wireless communication method that relays communication between a base station and a mobile station that performs symbol synchronization by using a P-SCH, performs frame synchronization by using an S-SCH, and receives and demodulates/decodes a P-BCH by using an RS at the time of cell searching, by using a centralized control resource and a distributed control resource. The wireless communication method includes: transmitting the P-BCH, the S-SCH, and the P-SCH for centralized control to the centralized control resource; transmitting the P-BCH and the S-SCH for distributed control to the distributed control resource; specifying OFDM symbol timing and sub-frame timing based on the concentrated P-SCH by using the mobile station; specifying wireless frame timing, a cell ID group, and wireless frame timing based on the S-SCH for the centralized control, by using the mobile station; specifying a cell ID and a sector index based on the RS for the centralized control by using the mobile station; calculating the cell ID group of the S-SCH for the distributed control by using the mobile station; and specifying the cell ID and the sector index based on the RS for the distributed control and reporting the specified cell ID together with a reception quality by using the mobile station in a case where the mobile station determines that there is a resource of which the reception quality of the S-SCH for the distributed control is equal to or higher than a threshold value, and reporting the cell ID specified based on the RS for the centralized control together with the reception quality by using the mobile station in a case where the mobile station determines that there is no resource of which the reception quality of the S-SCH for the distributed control equals to or higher than the threshold value.

According to the above-described confirmation, by transmitting the P-SCH to a centralized control resource and not transmitting the P-SCH to a distributed control resource, cell searching for ail the centralized control resources and the distributed control resources can be performed in an easy manner. In addition, the resource that transmits the P-SCH can be reduced.

A wireless communication system according to the present invention includes: a base station that manages a centralized control resource; a relay station that manages a distributed control resource; and a mobile station that performs symbol synchronization by using a P-SCH, performs frame synchronization by using an S-SCH, and receives and demodulates/decodes a P-BCH at the time of cell searching. The relay station transmits the P-BCH, the S-SCH, and the P-SCH for centralized control to the centralized control resource and transmits the P-BCH and the S-SCH for distributed control to the distributed control resource.

According to the above-described configuration, by limiting the transmission of the P-SCH as for the centralized control, the frequency for which the P-SCH is searched in the initial cell search can be limited to the frequency used for the centralized control. Accordingly, the synchronization of timing can be specified in an easy manner.

Advantageous Effects

According to the present invention, by limiting the transmission of the P-SCH to the centralized control resource, the frequency for which the P-SCH is searched can be limited to the centralized control frequency at the initial period of the cell searching. Accordingly, the timing synchronization can be specified in an easy manner, and the cell search for both the centralized control resource and the distributed control resource can be performed in an easy manner. Therefore, while a time needed for the cell searching is suppressed, advantages of both the centralized control and the distributed control can be selectively utilized.

EXPLANATION OF REFERENCES 1, 2: RELAY STATION
3, 4: MOBILE STATION
5: BASE STATION
11: CENTRALIZED CONTROL SCH BCH GENERATING UNIT
12, 23: P-SCH GENERATING SECTION
13: S-SCH GENERATING SECTION
14, 24: RS GENERATING SECTION
15: MULTIPLICATION SECTION
16, 27: SCRAMBLING CODE GENERATING SECTION
17, 28: P-BCH GENERATING SECTION
18, 29: ENCODING AND MODULATING SECTION
19, 30: SFBC ENCODING SECTION
21: DISTRIBUTED CONTROL SCHBCH GENERATING UNIT
22: CELL ID GROUP CALCULATING SECTION
26: CELL ID AND SECTOR INDEX INFORMATION GENERATING SECTION
31: DATA SEPARATING UNIT
32: CENTRALIZED CONTROL RESOURCE ALLOCATION UNIT
33: DISTRIBUTED CONTROL RESOURCE ALLOCATION UNIT
34: DEMODULATING AND DECODING UNIT
35, 36: ENCODING AND MODULATING UNIT
37: SIGNAL SEPARATING UNIT
38: FFT UNIT
39: WIRELESS RECEPTION UNIT
40, 44: ANTENNA
41: MULTIPLEXING UNIT

42: IFFT UNIT
43: WIRELESS TRANSMISSION UNIT
57: CENTRALIZED CONTROL RECEPTION PROCESSING UNIT
58: P-SCH RECEPTION PROCESSING SECTION
59: S-SCH RECEPTION PROCESSING SECTION
60, 66: RS RECEPTION PROCESSING SECTION
61, 67: DATA RECEPTION PROCESSING SECTION
62, 68: P-BCH RECEPTION PROCESSING SECTION
63: DISTRIBUTED CONTROL RECEPTION PROCESSING UNIT
64: CELL ID GROUP CALCULATING SECTION
65: S-SCH RECEPTION PROCESSING UNIT
69: DE-MULTIPLEXING UNIT
71: SYMBOL TIMING DETECTING UNIT
81: CELL ID CALCULATING UNIT
82: TRANSMISSION SELECTING UNIT

BEST MODE FOR CARRYING OUT THE INVENTION

The present invention relates to cell searching in a communication system as shown in FIG. 1. Thus, first, the cell searching procedure that becomes a premise will be described.

In a multi-carrier communication system, in order to identify a cell that is covered by a base station apparatus 5, a different scrambling code is assigned to each cell. In this communication system, mobile station apparatuses 3 and 4 need to perform cell searching, that is, identification of a scrambling code used for identifying a cell when switching (hand-over) between cells accompanied with the movement thereof, intermittent reception, or the like is performed. As a method of the cell searching, a three-step cell searching is well known (for example, see Hanada, Shin, Higuchi, and Sawahashi, "Three-Step Cell Searching Characteristics in Broadband Multi-Carrier CDMA Transmission Using a Frequency Multiple Synchronization Channel", TECHNICAL REPORT OF IEICE NS2001-90, RCS2001-91(2001-07), pp 73 to 78).

A three-step cell searching is performed in order of detection of symbol timing (first step), identification of a scrambling code group and scrambling code timing, that is, detection of frame timing (second step), and identification of a scrambling code (third step).

Furthermore, for the object of seamless transition to a 4G system, standardization of a cellular system corresponding to 3.9G is performed through 3GPP (3rd Generation Partnership Project) LTE (Long Term Evolution). Thus, a cell search or an SCH becomes a topic content. In the 3GPP LTE, as the configuration of the SCH, a C-layered SCH, in which a layered SCH such as W-CDMA (Wideband Code Division Multiple Access) is employed, is configured by a P-SCH and an S-SCH.

Figure 2:
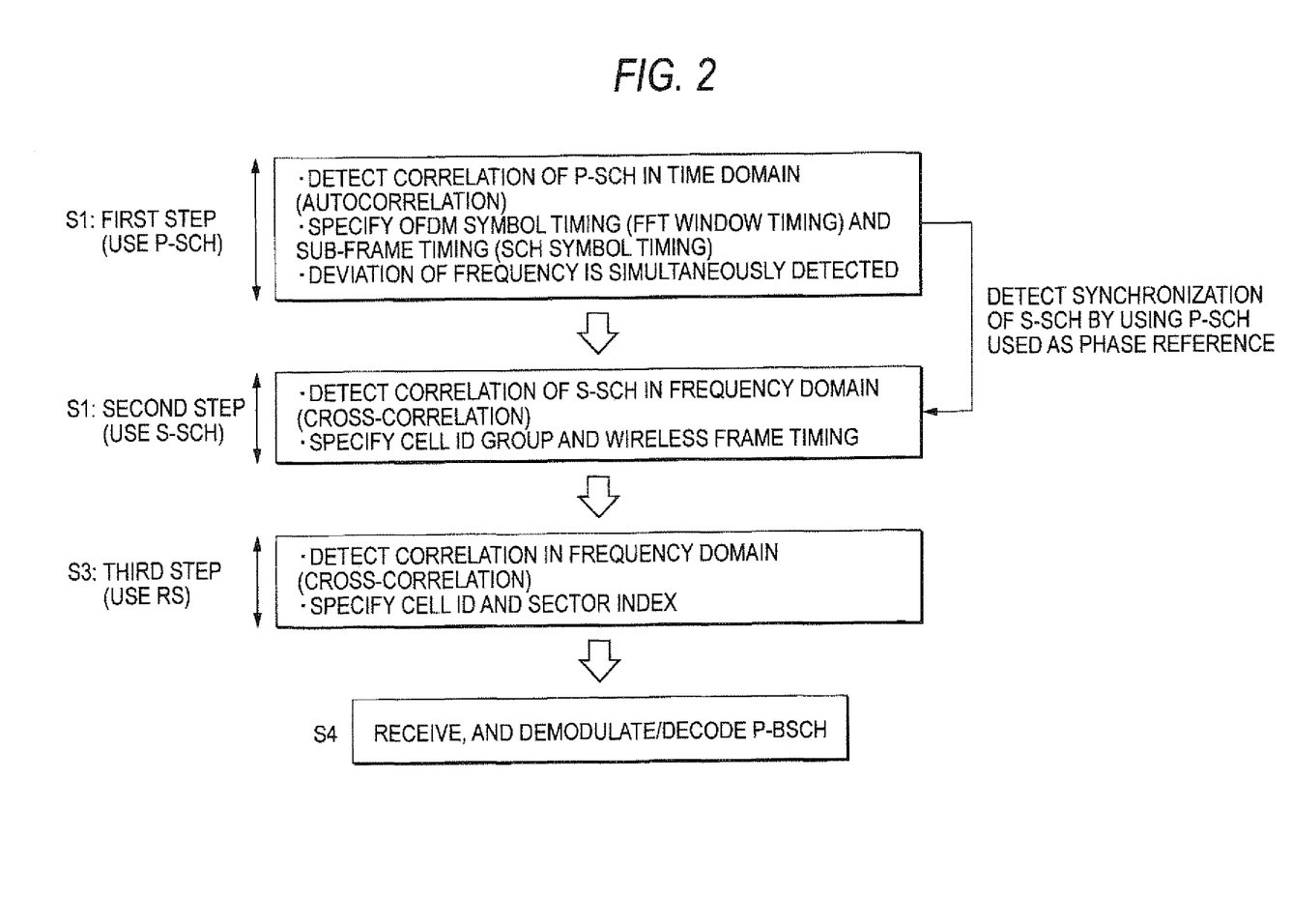
FIG. 2 is a diagram for illustrating a three-step cell searching procedure.

In addition, as a cell searching procedure, the above-described three-step cell search is employed. The procedure of this three-step cell search is as follows. Symbol timing detection is performed by using the P-SCH in the first step, and frame timing detection and cell ID group detection are performed by using the S-SCH in the second step. Then, in the third Step, cell ID detection is performed by using an RS (Reference Symbol), and thereafter, demodulation of the P-BCH (Primary-Broadcast CHannel) is performed. FIG. 2 represents a cell search sequence.
(1) First Step: Symbol Synchronization (Step S1)
(Use of P-SCH)
First, a mobile station apparatus detects OFDM symbol timing and sub-frame timing (SCH symbol timing) by detecting the correlation of the P-SCH in the time domain. At this time, the mobile station apparatus simultaneously detects a frequency deviation. In particular, in the first step, the mobile station apparatus specifies the PSC (Primary Synchronization Codes) series based on cross correlation that is based on the application of PVC (Precoding Vector Switching) to the SCH transmission diversity. The mobile station apparatus specifies a pre-coding weight matrix by specifying the PSC series.
(2) Second Step: Frame Synchronization (Step S2)
(Use of S-SCH)
The mobile station apparatus performs synchronized detection of the S-SCH with the P-SCH detected in the first step used as a phase reference and takes cross correlation of the S-SCH on the frequency domain, thereby specifying a cell ID group and wireless frame timing.
(3) Third Step: Cell ID identification (Step S3)
(Use of RS)
The mobile station apparatus specifies a cell ID and a sector index by detecting the cross correlation of the RS based on the cross correlation on the frequency domain. Thereafter, the mobile station apparatus receives and demodulates/decodes the P-BCH (Step S4).
(Embodiment 1)
In this embodiment, a relay station relays both distributed control resources and centralized control resources. The relay station transmits a P-BCH (Primary-Broadcast CHannel) and an S-SCH (Secondary-Synchronization CHannel) for the centralized control resources and a P-BCH and an S-SCH for the distributed control resources. By simultaneously transmitting the centralized control resource from a plurality of relay stations in accordance with a direction transmitted from the base station, a diversity effect can be acquired. The distributed control resource is scheduled and transmitted independently by each relay station.

Thus, in this embodiment, in order to allow easy specification of the synchronization at the time of a cell search, the P-SCH (Primary Synchronization CHannel, first synchronization channel) is transmitted to the centralized control resource, and is not transmitted to the distributed control resource. As described above, by transmitting the P-BCH and S-SCH for the centralized control and the P-BCH and the S-SCH for the distributed control in a separated manner, the P-BCH and the S-SCH can be recognized as different cells by the mobile station.

In addition, by limiting the transmission of the P-SCH as for the centralized control, the frequency for which the P-SCH is searched in the initial cell search can be limited to the frequency used for the centralized control resource. Accordingly, the synchronization of timing can be specified in an easy manner.

Figure 3:
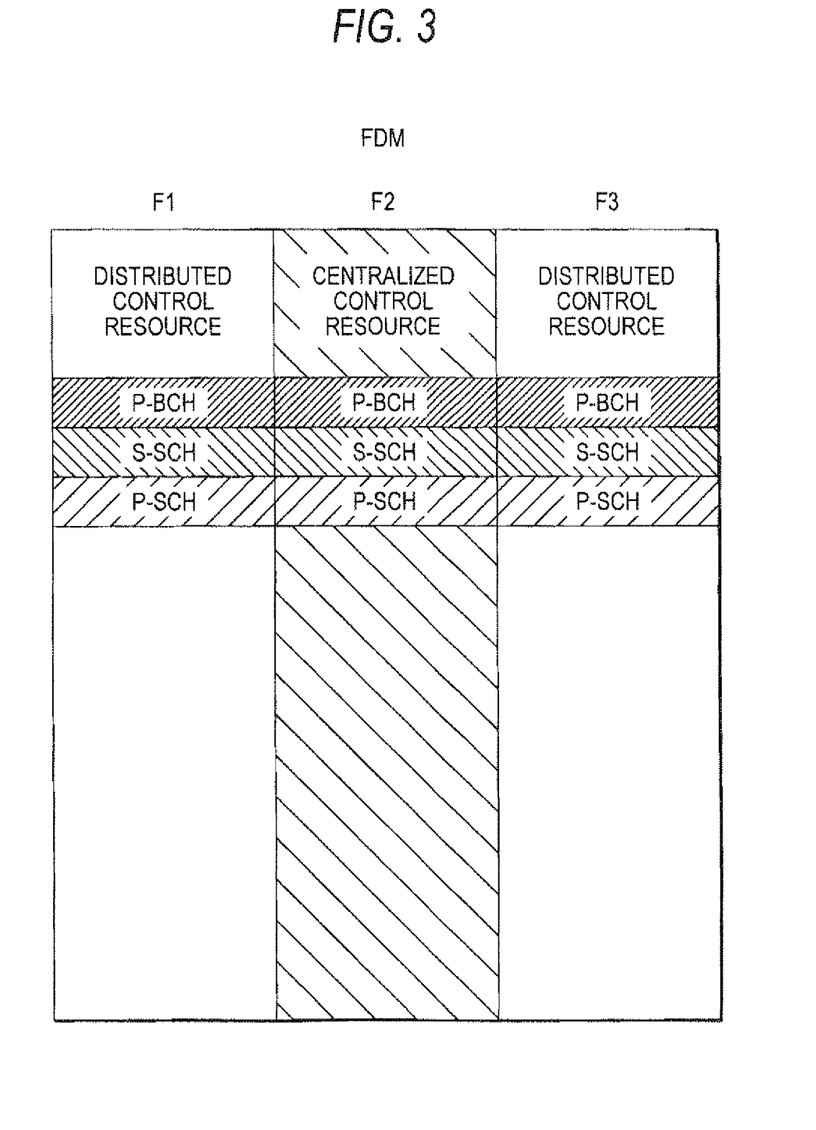
FIG. 3 is a diagram representing an example in which centralized control resources and distributed control resources are frequency-divided.

In other words, according to this embodiment, the scheduling load of the base station is reduced while suppressing the time needed for a cell search, and accordingly, cooperative relay can be performed in an easy manner. In addition, the base station can respond to a change in the traffic for each relay station, and the centralized control and the distributed control can be used for each relay station. In addition, the time needed for a cell search is suppressed, and accordingly, a time needed for handover of a cell of which the synchronization is not taken is suppressed, too.
[Operation Diagram]
First, before the description of this embodiment, an example in which the centralized control resources and the distributed control resources are divided into frequencies, and the P-BCH, the S-SCH, and the P-SCH are arranged for each resource is shown in FIG. 3. Since an RS signal is included in the P-BCH signal, the RS signal is not shown in the figure. By transmitting the P-BCH, the S-SCH, and the P-SCH for each divided resource, the P-BCH, the S-SCH, and the P-SCH can be recognized as different cells by the mobile station.

For the case of frequency division, F2 is a centralized control resource. For example, a relay station 1 transmits a P-BCH, an S-SCH, and a P-SCH of F1 and F2, and a relay station 2 transmits a P-BCH, an S-SCH, and a P-SCH of F2 and F3. Thus, F2 is relayed in a cooperative manner by the relay station 1 and the relay station 2.

For each divided resource, a different P-BCH and a different S-SCH are transmitted. Accordingly, the mobile station recognizes that F1, F2, and F3 are cells that are different from each other. In addition, the centralized control resource is related in a cooperative manner by the relay station 1 and the relay station 2. Accordingly, it becomes easy to specify synchronization based on the diversity effect.

However, in the frequency division, the P-SCH is transmitted for each frequency, accordingly, the synchronization of timing at the time of cell searching needs to be acquired in a plurality of frequencies. In a case where the synchronization is acquired in the plurality of frequencies, there is a problem in that there is a large amount of correlation calculation needed for acquiring the synchronization.

Thus, in this embodiment, the P-SCH is transmitted only in the centralized control resource but is not transmitted in the distributed control resource. The arrangement of the P-BCH, the S-SCH, and the P-SCH according to this embodiment is shown in FIG. 4.

Figure 4A:
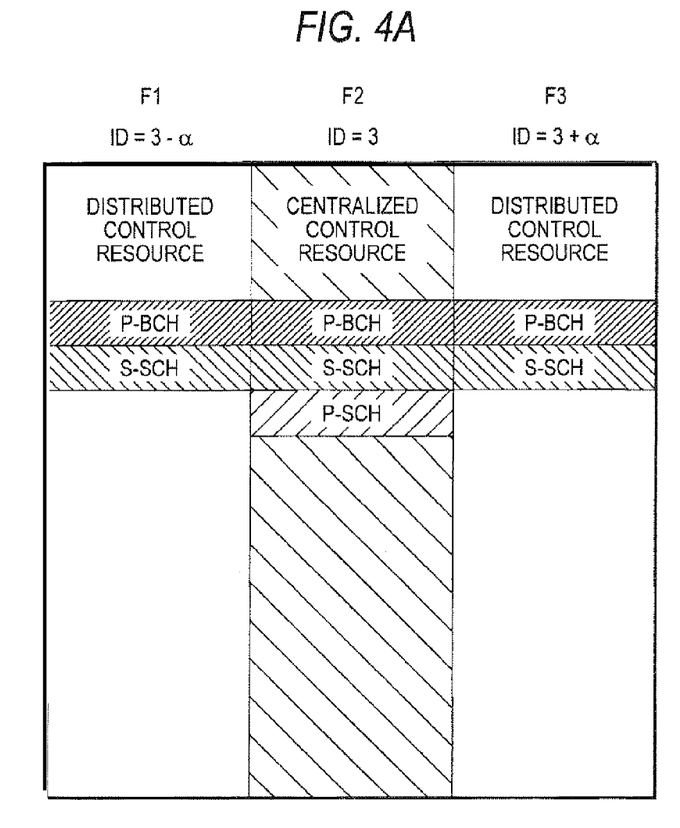
FIG. 4 is a diagram representing the arrangement of a P-BCH, an S-SCH, and a P-SCH in Embodiment 1 of the present invention.

FIG. 4A is an example in which a P-BCH and an S-SCH for centralized control and a P-BCH and an S-SCH for distributed control are frequency-divided, and the P-BCH and the S-SCH for distributed control are transmitted to a distributed control resource.

Figure 4B:
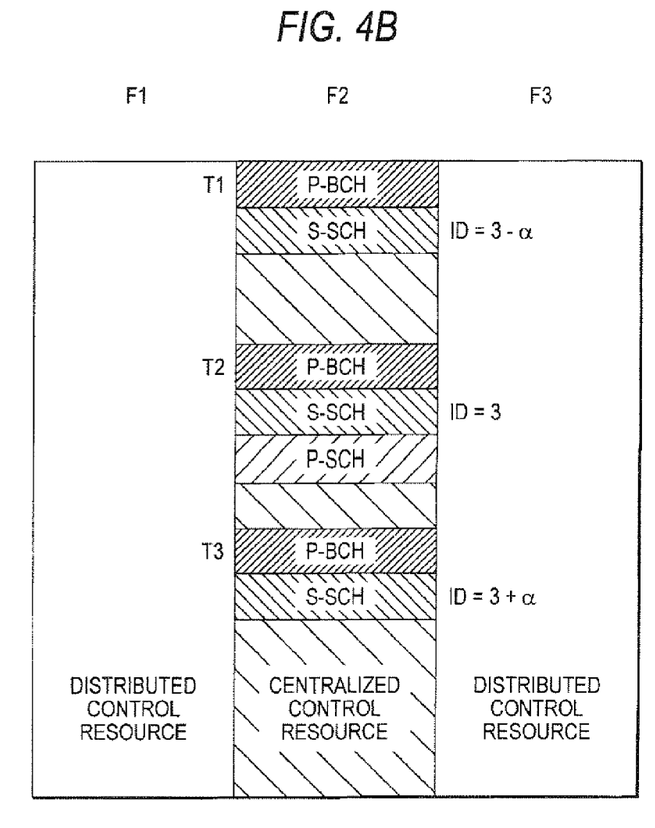

FIG. 4B is an example in which a P-BCH and an S-SCH for centralized control and a P-BCH and an S-SCH for distributed control are frequency-divided, and the P-BCH and the S-SCH for distributed control are transmitted to a centralized control resource.

Since the relay station transmits the P-SCH as a centralized control resource, the mobile stations 3 and 4 can specify sub-frame timing by using only the centralized control resources. After specifying the sub-frame timing, the mobile stations 3 and 4 perform signal processing of the S-SCH for centralized control and the S-SCH for distributed control so as to specify the cell ID groups and the timing of a wireless frame. Thereafter, the mobile stations 3 and 4 perform signal processing of the RS so as to specify cell IDs and sector indices.

In addition, the cell ID group specified by the S-SCH is designed such that a cell ID for distributed control can be calculated from the cell ID for centralized control. In FIG. 4(a), the cell group ID for centralized control is 3, and the S-SCH for centralized control is transmitted to F2.

The S-SCH of the distributed control resource is transmitted to F1 and F3. The S-SCH transmitted to F1 and the S-SCH transmitted to F3 are cell ID groups acquired by adding α representing a deviation from the cell ID group (ID=3) of the centralized control resource in the frequency direction. In the figure, F1 becomes 3−α that is acquired by subtracting α from the cell ID group of the centralized control, and F3 becomes 3+α that is acquired by adding α to the cell ID group of the centralized control. As described above, the mobile stations 3 and 4 can specify the group IDs for the distributed control resources that are deviated in the frequency direction by specifying the cell group ID of the centralized control resource. Accordingly, the amount of correlation calculation of the S-SCH can be decreased. In addition, in a case where the distributed control resource is not in service, the S-SCH is not transmitted. Accordingly, the mobile stations 3 and 4 can determine no service due to a low correlation value.

In the case of FIG. 4(b), similarly, the cell group ID for the centralized control is 3, and the S-SCH is transmitted at time T2 of F2. The S-SCH of the distributed control resource is transmitted at time T1 and T3 of F2.

The S-SCH transmitted at T1 and the S-SCH transmitted at T3 are cell ID groups acquired by adding α that representing a deviation from the cell ID group of the centralized control resource in the time direction. In the figure, T1 becomes 3−α that is acquired by subtracting α from the cell ID group of the centralized control, and T3 becomes 3+α that is acquired by adding α to the cell ID group of the centralized control.

Accordingly, in a case where the S-SCH of the cell controlled to be distributed in the time-axis direction is searched, the cell group ID for which a correlation process is performed can be changed in accordance with the deviation in the time-axis direction. Therefore, the amount of correlation calculation can be decreased.

The frequency for which the centralized control resource is arranged is more preferably the frequency for which the base station transmits the P-BCH, the S-SCH, and the P-SCH. By arranging the P-SCH transmitted by the base station and the P-SCH transmitted by the relay station at the same frequency, the number of frequencies for which correlation calculation is performed for specifying the sub-frame timing can be decreased. In addition, in the LTE, the P-SCH that is transmitted by all the cells has the same frequency. Accordingly, by using a same method as that of the LTE system, the sub-frame timing can be specified.

According to this embodiment, when the synchronization of the resource for the centralized control cannot be specified, the synchronization of the resource for the distributed control is not specified. In addition, the resource for the centralized control is cooperatively relayed. Accordingly, compared to the distributed control resource that is transmitted from a single relay station, there is a characteristic that the reception quality is high due to the diversity effect. Consequently, when the synchronization cannot be specified by the centralized control resource, the synchronization is not specified for the resource of the distributed control, Accordingly, unnecessary calculation can be omitted,

[Block Diagram of Relay Station]

Figure 5:
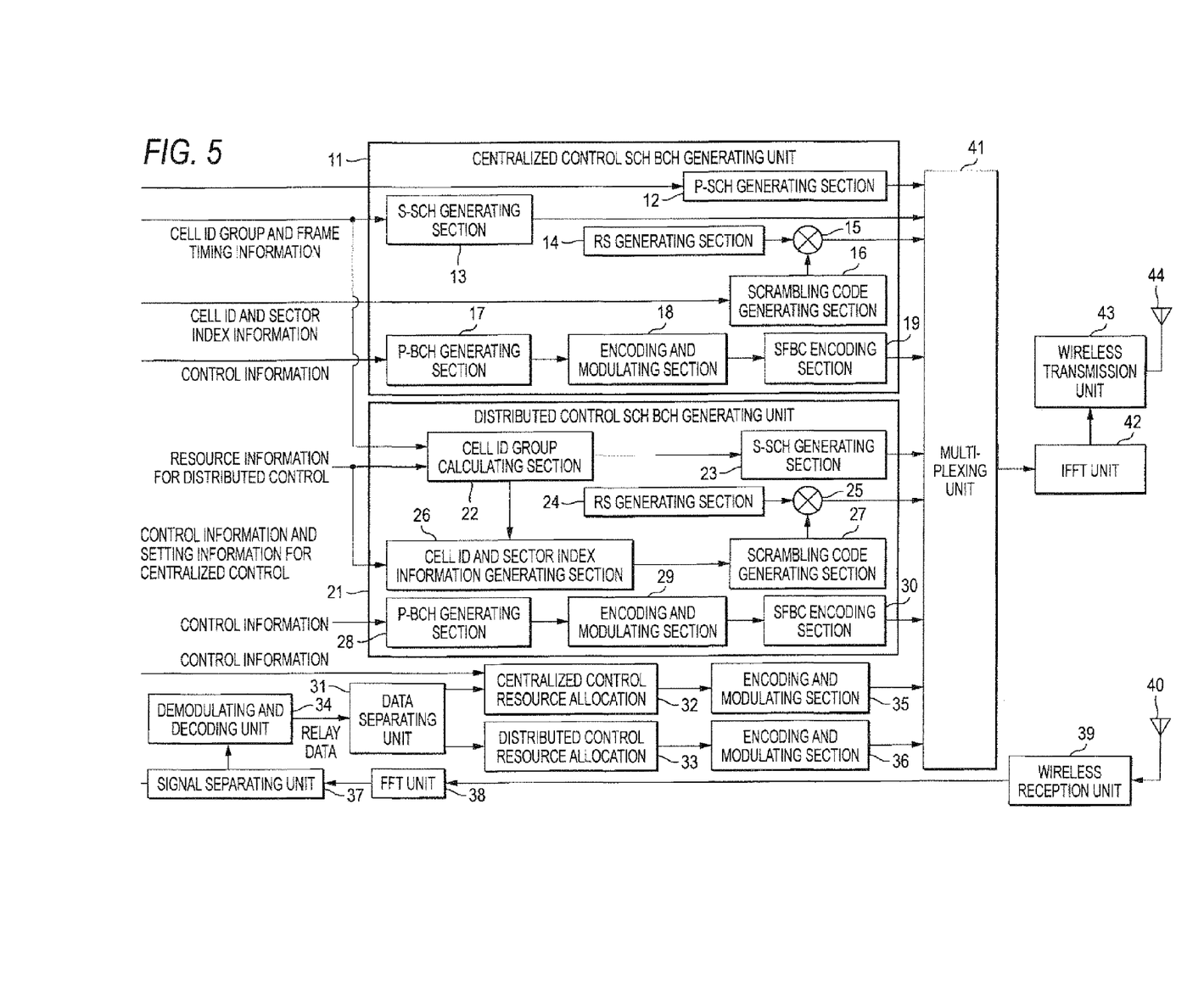
FIG. 5 is a block diagram representing the configuration of a relay station apparatus according to Embodiment 1 of the present invention.

FIG. 5 is a block diagram representing the configuration of a relay station apparatus according to this embodiment. A wireless reception unit 39 receives a signal transmitted from a mobile station or a relay station through an antenna 40, performs wireless processing such as down-converting for the received signal, and outputs the processed signal to an FFT unit 38. The FFT unit 38 performs an FFT process by using detected FFT window timing and outputs a resultant signal to a signal separating unit 37.

The signal separating unit 37 separates the relay data and the control information for centralized control and setting information that are received from the base station. The relay data is output to the demodulating and decoding unit 34. The control information and the setting information are output to a centralized control resource allocation unit 32, a centralized control SCHBCH generating unit 11, and a distributed control SCHBCH generating unit 21.

The demodulating and decoding unit 34 demodulates and decodes the relay data and outputs resultant data to the data separating unit 31. In a case where the received relay data is transmitted to the centralized control resource, the data separating unit 31 outputs the received relay data to the centralized control resource allocation unit 32. In a case where the received relay data is transmitted to the distributed control resource, the data separating unit 31 outputs the received relay data to the distributed control resource allocation unit 33.

The centralized control resource allocation unit 32 allocates resources in accordance with the control information for centralized control that is received from the base station and outputs the relay data to an encoding and modulating unit 35. The distributed control resource allocation unit 33 allocates resources in accordance with control information generated by the relay station and outputs the relay data to the encoding and modulating unit 36. The encoding and modulating units 35 and 36 encode and modulate the relay data and output resultant relay data to a multiplexing unit 41.

The centralized control SCHBCH generating unit 11 is configured by a P-SCH generating section 12, an S-SCH generating section 13, an RS generating section 14, a multiplication section 15, a scrambling code generating section 16, a P-BCH generating section 17, an encoding and modulating section 18, and an SFBC encoding section 19.

The P-SCH generating section 12 generates a P-SCH by using a PSC series assigned to each cell that is designated in the control information and setting information for centralized control and outputs the P-SCH to the multiplexing unit 41. The S-SCH generating section 13 generates an S-SCH by using an SSC (Secondary Synchronization Codes) series corresponding to the cell ID group timing information that is designated in the control information and setting information for centralized control and outputs the S-SCH to the multiplexing unit 41.

The RS generating section 14 generates an RS (Reference Symbol) series corresponding to a pilot signal. The scrambling code generating section 16 generates a scrambling code series, which is unique to a cell, generated based on the cell ID and sector index information designated in the control information and setting information for centralized control.

The multiplication section 15 multiplies the RS series generated by the RS generating section 14 by the scrambling code series, which is unique to the cell, generated by the scrambling code generating section 16 and outputs the result to the multiplexing unit 41. The P-BCH generating section 17 generates a bit series (P-BCH) corresponding to the control information and outputs the bit series to the encoding and modulating section 18. The encoding and modulating section 18 encodes and modulates the bit series generated by the P-BCH generating section 17 and outputs the resultant bit series to the SFBC encoding section 19. The SFBC encoding section 19 performs an SFBC encoding process and outputs the processed P-BCH to the multiplexing unit 41.

The distributed control SCH BCH generating section 21 has the configuration acquired by adding a cell ID group calculating section 22, a cell ID and sector index information generating section 26 to the configuration of the centralized control SCH BCH generating unit 11 and eliminating the P-SCH generating section 12 from the configuration.

The cell ID group calculating section 22 calculates the centralized control cell ID group and resource information (distributed control resource information) assigned to the station for transmission of the distributed control P-BCH and S-SCH and determines a cell ID group. In this calculation, a number acquired by adding an integer a* (variable of a resource number) to the centralized control cell ID group number is set as the distributed control cell ID group number. The cell 1D group calculating section 22 inputs the cell ID group as the result of the calculation to the S-SCH generating section 23.

The cell ID and sector index information generating section 26 generates a cell ID and sector index information in accordance with the distributed control resource information assigned to the station and the cell ID group number output from the cell ID group calculating section 22 and inputs the cell ID and the sector index information to the scrambling code generating section 27.

The multiplexing unit 41 performs a time-multiplexing process for generating a wireless frame for signals output from the centralized control SCH BCH generating unit 11, the distributed control SCH BCH generating unit 21, and the encoding and modulating units 35 and 36 so as to generate a transmission signal and outputs the transmission signal to an IFFT unit 42. The IFFT unit 42 performs an IFFT process for the transmission signal output from the multiplexing unit 41, converts data of the time axis into data of the frequency axis so as to generate an OFDM symbol, and outputs the OFDM symbol to the wireless transmission unit 43. The wireless transmission unit 43 performs wireless processing such as up-converting for the signal after modulation that is output from the IFFT unit 42 and relays and transmits the processed signal to the base station from the antenna 44.

Figure 6:
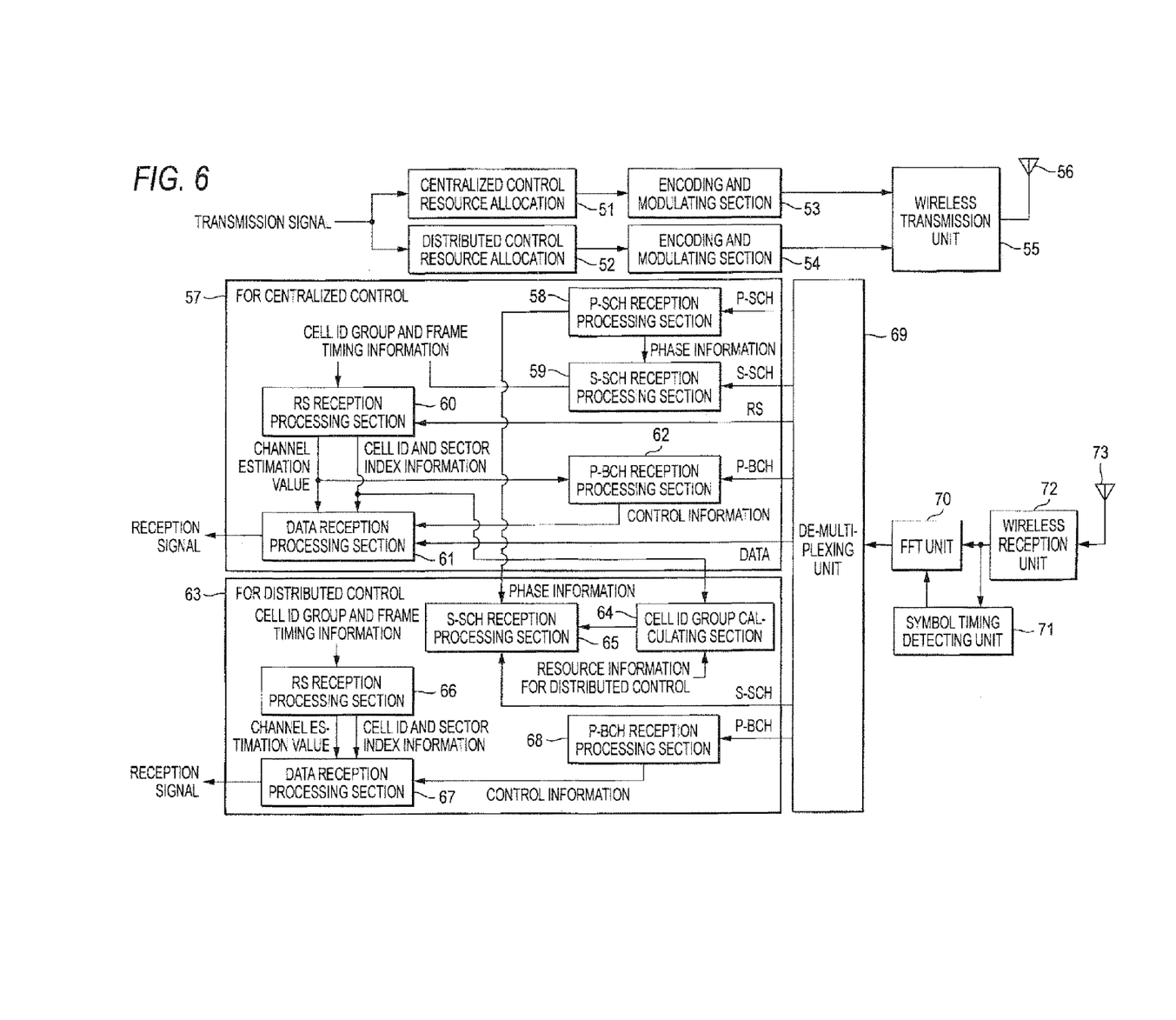
FIG. 6 is a block diagram representing the configuration of a mobile station apparatus according to Embodiment 1 of the present invention.

FIG. 6 is a block diagram representing the configuration of a mobile station apparatus according to this embodiment. The description of the same portion as that of the relay station shown in FIG. 5 is omitted. A symbol timing detecting unit 71 detects the OFDM symbol timing (FFT window timing) and the SCH symbol timing by detecting a reception signal based on autocorrelation. This process corresponds to a first half part of the first step (Step S1) of the cell searching procedure.

A de-multiplexing unit 69 outputs the reception signal to the centralized control reception processing unit 57. In other words, the de-multiplexing unit 69 divides the reception signal into the P-SCH, the S-SCH, the RS, the P-BCH, and data. Then, the de-multiplexing unit 69 outputs the centralized control and distributed control P-SCH to the P-SCH reception processing section 58, outputs the S-SCH to an S-SCH reception processing section 59, and outputs the RS to he RS reception processing section 60, and outputs the P-BCH to a P-BCH reception processing section 62, and outputs the data to a data reception processing section 61.

(Centralized control Reception Processing Unit 57)

After buffering a reception signal for a predetermined time, the P-SCH reception processing section 58 performs autocorrelation of the reception signal. At this time, the OFDM symbol timing (one symbol interval) and the SCH symbol timing (the position of the SCH) can be specified by detecting a peak value of the autocorrelation characteristic of the P-SCH of the reception signal.

In addition, the P-SCH reception processing section 58 specifies the PSC series used in the P-SCH by performing detection of cross-correlation between the reception signal and a PSC series replica that is a P-SCH series. The P-SCH reception processing section 58 outputs the phase information specified by the detection of the cross-correlation to the S-SCH reception processing section 59 and the S-SCH reception processing section 65 of the distributed control reception processing unit 63.

The S-SCH reception processing section 59 performs detection of cross-correlation between the S-SCH and the SSC series replica based on the phase information and specifies the cell ID group and the frame timing. The S-SCH reception processing section 59 outputs the cell ID group and the frame timing information that have been specified to the RS reception processing unit 60.

The RS reception processing section 60 performs a process corresponding to the third step (Step S3) of the cell searching procedure based on the cell ID group and the frame timing information and outputs the cell ID and the sector index information to the data reception processing section 61. In addition, the RS reception processing section 60 performs channel estimation based on the RS and outputs a channel estimation value to the P-BCH reception processing section 62 and the data reception processing section 61.

The P-BCH reception processing section 62 performs a reception process of the P-BCH by using the channel estimation value transmitted from the RS reception processing section 60 and outputs the control information to the data reception processing section 61. The data reception processing section 61 performs a reception process such as demodulating and decoding based on the channel estimation value, the control information, the cell ID and the sector index information and acquires reception data (reception signal).

(Distributed Control Reception Processing Unit 63)

The distributed control reception processing unit 63 is acquired by adding a cell ID group calculating section 64 to the configuration of the centralized control reception processing unit 57 and eliminating the P-SCH reception processing section 58 from the configuration. In addition, a part of the operation of the S-SCH reception processing unit 65 is different.

The cell ID group calculating section 64 calculates a cell ID group number using the cell ID group and the sector index information input from the centralized control reception processing unit 57 and received distributed control resource information. The cell ID group calculating section 64 inputs the result of calculation to the S-SCH reception processing section 65.

The S-SCH reception processing section 65 specifies an SSC series replica based on the cell ID group number input from the cell ID group calculating section 64 and the phase information input from the P-SCH reception processing section 58 and detects cross-correlation. As a phase reference at a time when the cross-correlation is detected, a part of the S-SCH signal may be used, or the RS may be used.

Figure 7:
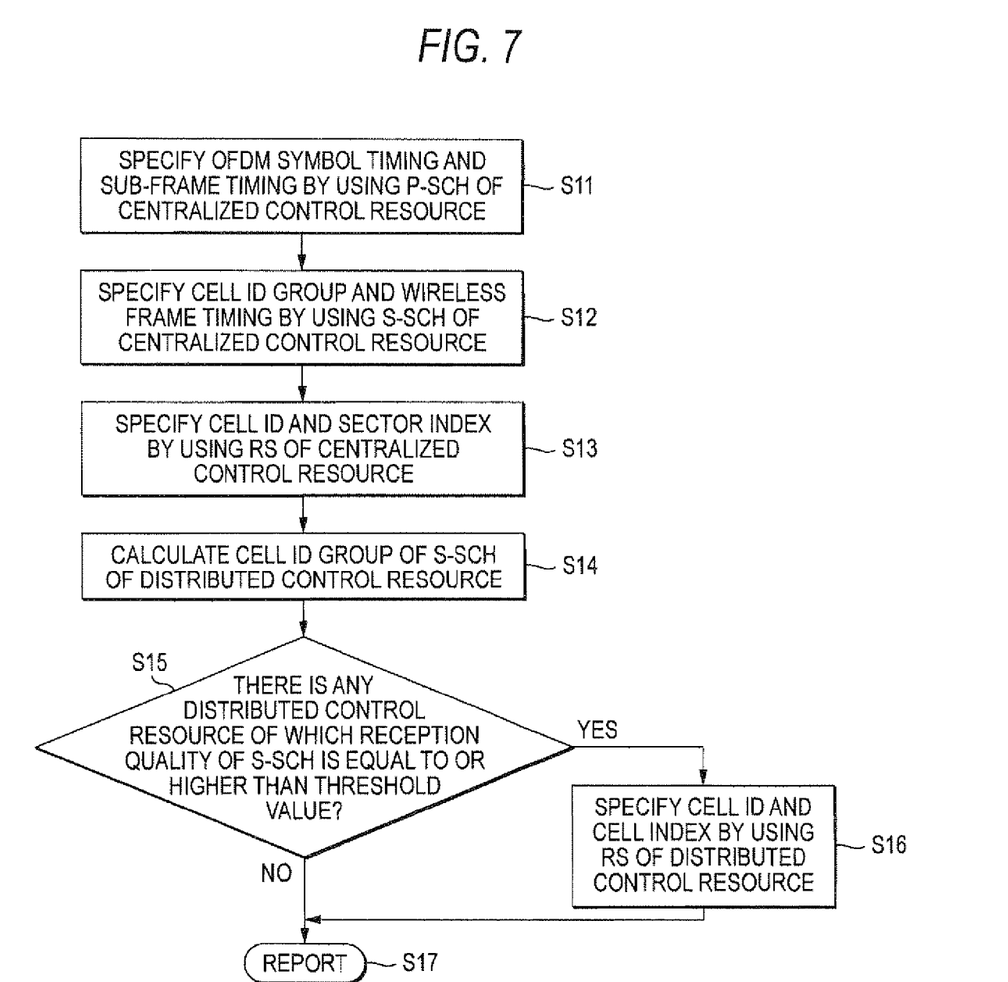
FIG. 7 is a flowchart representing the cell searching operation of a mobile station according to Embodiment 1 of the present invention.

The operation of the cell searching operation of the mobile station is represented in the flowchart of FIG. 7. The mobile station, first, specifies the OFDM symbol timing and the sub-frame timing based on the P-SCH of the centralized control resource (Step S11). Then, the mobile station specifies the cell ID group and the wireless frame timing based on the S-SCH of the centralized control resource (Step S12).

Next, the mobile station specifies the cell ID and the sector index based on the RS of the centralized control resource (Step S13) and calculates the cell ID group of the S-SCH of the distributed control resource (Step S14).

Next, in Step S15, when there is a resource of which the reception quality of the S-SCH is equal to or higher than a threshold value as a distributed control resource (YES), the mobile station proceeds to Step S16. On the other hand, when there is no resource of which the reception quality of the S-SCH is equal to or higher than the threshold value (NO), the process proceeds to Step S17.

In Step S16, the mobile station specifies the cell ID and the sector index based on the RS of the distributed control resource. In addition, in Step S17, the mobile station reports the cell ID specified in the centralized control and distributed control resource together with the reception quality. In other words, when determining that there is a resource of which the reception quality of the S-SCH for distributed control is equal to or higher than the threshold value, the mobile station specifies the cell ID and the sector index based on the RS for distributed control and reports the specified cell ID together with the reception quality (Step S15: YES, Step S16 and Step S17). On the other hand, when determining that there is no resource of which the reception quality of the S-SCH for distributed control is equal to or higher than the threshold value, the mobile station reports the cell ID specified based on the RS for centralized control together with the reception quality (Step S15: NO, Step S17).

As described above, according to this embodiment, by transmitting the P-SCH to a centralized control resource and not transmitting the P-SCH to a distributed control resource, cell searching for all the centralized control resources and the distributed control resources can be performed in an easy manner. In addition, the resource that transmits the P-SCH can be reduced.

(Second Embodiment)

In this embodiment, the arrangement of the P-SCH and the S-SCH, and the P-BCH for a case where a centralized control resource and a distributed control resource are allocated on the time-axis is represented. When the centralized control and the distributed control are simply assigned on the time axis, there is a problem in that the P-SCH cannot be periodically received. Thus, according to this embodiment, even when the distributed control is transmitted, the P-SCH, the S-SCH, and the P-BCH for centralized control are periodically transmitted. Accordingly, the mobile state that performs cell searching can receive the P-SCH, the S-SCH, and the P-BCH for centralized control.

[Operation Diagram]

Figure 8:
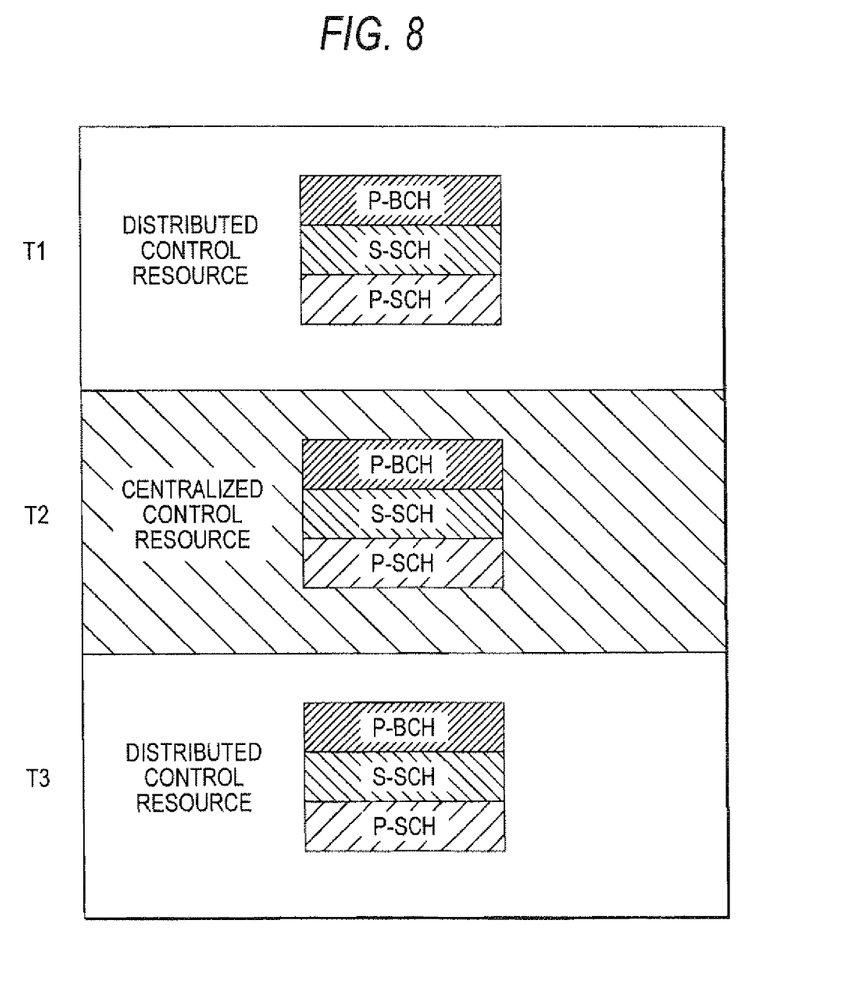
FIG. 8 is a diagram representing an example in which centralized control resources and distributed control resources are time-divided.

First, before the description of this embodiment, an example in which the P-BCH, the S-SCH, and the P-SCH are arranged to each resource by time-dividing the centralized control resource and the distributed control is shown in FIG. 8. When the P-BCH, the S-SCH, and the P-SCH are transmitted for divided resources, each of the P-BCH, the S-SCH, and the P-SCH can be recognized by a different cell and a mobile station.

Similarly to the frequency division (Embodiment 1), even in the case of the time division, when T2 is a centralized control resource, T1 and T3 are distributed control resources, and a different P-BCH and the S-SCH are transmitted, T1, T2, and T3 are recognized as different cells.

In addition, when the relay station 1 transmits the P-BCH, the S-SCH, and the P-SCH of T1 and T2, and the relay station 2 transmits the P-BCH, the S-SCH, and the P-SCH of T2 and T3, the synchronization of T2 can be specified in an easy manner based on the diversity effect of the cooperative relay.

However, in the time division, the numbers of transmissions and periods of the P-BCH, the S-SCH, and the P-SCH for centralized control resources vary in accordance with the amount of resources distributed to the centralized control. Accordingly, in a case where the P-BCH, the S-SCH, and the P-SCH of the distributed control resources are transmitted by a single relay station, there is a mobile station that cannot receive the P-BCH, the S-SCH, and the P-SCH.

Thus, in this embodiment, even when the P-BCH, the S-SCH, and the P-SCH for centralized control are time resources that are allocated to distributed control resources, the P-BCH, the S-SCH, and the P-SCH are transmitted from a plurality of relay stations. In such a case, since the P-BCH, the S-SCH, and the P-SCH are periodically transmitted, the mobile station can specify the synchronization in an easy manner. In addition, the number of mobile stations that can perform cell searching is increased based on the diversity effect.

Figure 9:
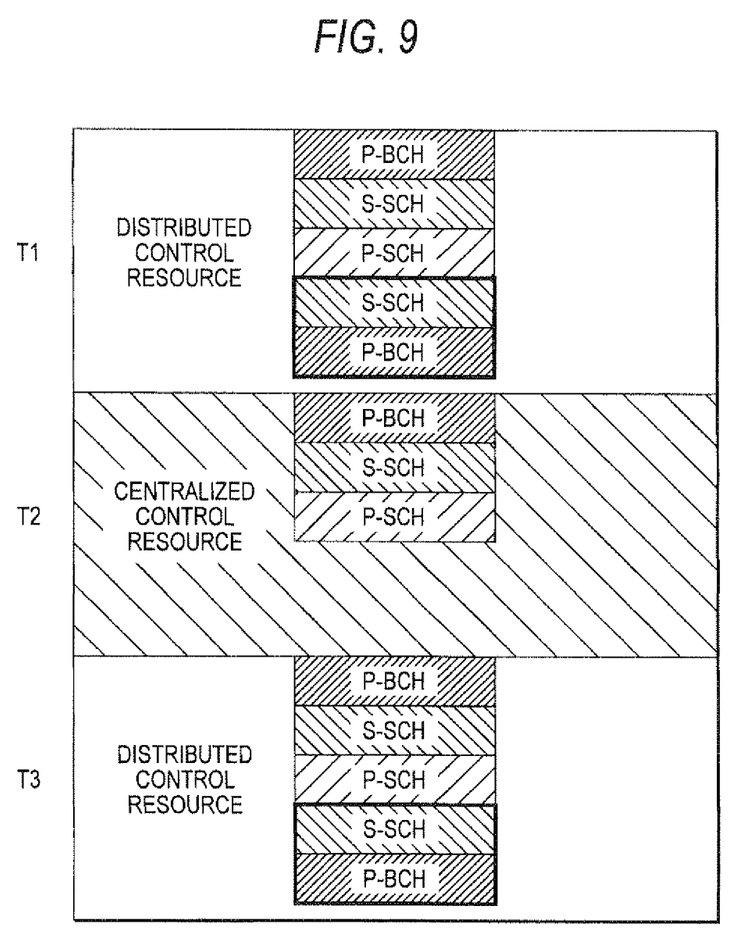
FIG. 9 is a diagram representing the arrangement of a P-BCH, an S-SCH, and a P-SCH in Embodiment 2 of the present invention.

The arrangement of the P-BCH, the S-SCH, and the P-SCH of this embodiment is represented in FIG. 9. T1 is a resource allocated to a relay station 1, T3 is a resource allocated to a relay station 2, and T2 is a resource that is cooperatively relayed by the relay station 1 and the relay station 2.

A P-BCH, an S-SCH, and a P-SCH for centralized control are transmitted to T2 by the relay station 1 and the relay station 2. The relay station 1 and the relay station 2 transmit a P-BCH, an S-SCH, and a P-SCH for centralized control to T1 and T3. In addition, the relay station 1 transmits a P-BCH and an S-SCH for distributed control of the relay station 1 to T1, and the relay station 2 transmits a P-BCH and an S-SCH for distributed control to T3.

Similarly to Embodiment 1, the P-SCH is not transmitted for distributed control, and the sub-frame timing is specified based on the P-SCH for centralized control. In addition, It is configured that the P-BCH and the S-SCH for distributed control can be specified based on the position of the P-SCH for centralized control.

In this example, the S-SCH for centralized control and the S-SCH for distributed control are arranged such that the P-SCH for centralized control is interposed therebetween. By arranging as described above, the arranged position of the S-SCH can be specified in an easy manner from the position of the P-SCH.

In addition, in the P-BCH for centralized control, an arrangement position of a centralized control resource is designated. In this example, T2 is a centralized control resource. T2 may be arranged such that the cell ID group can be specified based on the distance of a resource for distributed control from T2. Accordingly, similarly to Embodiment 1, the amount of correlation calculation of the S-SCH of distributed control can be decreased.

[Block Diagram of Relay Station]

Figure 10:
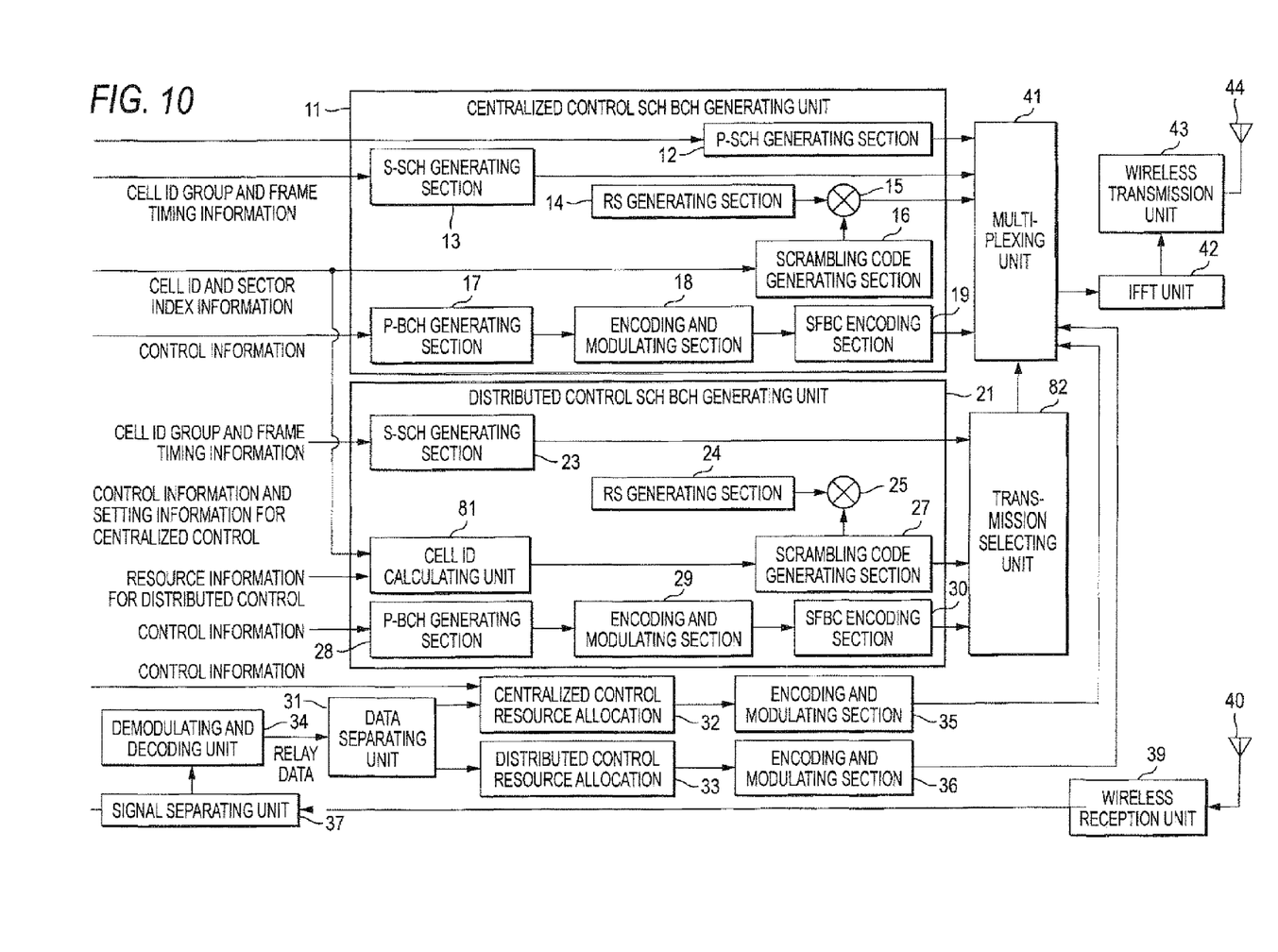
FIG. 10 is a block diagram representing the configuration of a relay station apparatus according to Embodiment 2 of the present invention.

FIG. 10 is a block diagram representing the configuration of a relay station apparatus according to this embodiment. The description of a portion that is common to that of FIG. 5 is omitted. The relay station apparatus shown in FIG. 10 is acquired by adding a transmission selecting unit 82 to the configuration of the relay station apparatus shown in FIG. 5 and eliminating the FFT unit 38 from the configuration.

(Transmission Selecting Unit 82)

An S-SCH, an RS, and a P-BCH are input to the transmission selecting unit 82 from the SCHBCH generating unit 21 for distributed control. In addition, distributed resource information is also input to the transmission selecting unit 82. The transmission selecting unit 82 transmits the S-SCH, the RS, and the P-BCH for distributed control only when a distributed control resource for the station is allocated.

The P-SCH, the S-SCH, the RS, and the P-BCH for centralized control are periodically transmitted.

According to this embodiment, even when a centralized control resource is allocated on the time axis, the P-SCH, the S-SCH, and the P-BCH for centralized control can be periodically received. Accordingly, the mobile station that performs cell searching can perform correlation calculation in an easy manner.

In addition, in the block diagrams (FIG. 5, FIG. 6, and FIG. 10), the block that is arranged for the centralized control or the distributed control may be commonly used in the centralized control and the distributed control. In addition, a resource may be a frequency resource, a time resource, a resource divided by a sign, a spatial space, and a combination thereof.

In addition, a resource to which the P-BCH and the S-SCH are transmitted may not be the same as the resource allocated to the cell. The mobile station can acquire the resource information allocated to the cell from the control information acquired from the P-BCH and follows the information.

In addition, a plurality of relay stations may be grouped so that, and the P-SCH, the S-SCH, and the P-BCH for the centralized control are assigned for each group. In addition, the relay station according to each of the above-described embodiment may be represented as a relay station, a repeater, a simplified base station, or a cluster head.

In addition, each functional block used in the description of each of the above-described embodiments is typically realized by an LSI as an integrated circuit. Such a block may be individually configured as one chip. In addition, a part or all of the functional blocks may be included in one chip. Here, the chip is described as an LSI. However, it may be referred to as an IC, a system LSI, a super LSI, or an ultra LSI depending on the degree of integration.

In addition, the technique of forming as an integrated circuit is not limited to the LSI. Thus, such a technique may be implemented by a dedicated circuit or a general purpose processor. An FPGA (Field Programmable Gate Array) that can be programmed after manufacture as an LSI or a reconfigurable processor in which connections of circuit cells inside the LSI or settings can be reconfigured may be used.

In addition, when technology of integration circuits that substitutes the LSI by progress of semiconductor technology or a derivative separate technology appear, naturally, the functional blocks may be integrated by using such technology. There is a possibility that bio technology is applied thereto.

The present invention has been described in detail with reference to specific embodiments. However, it is apparent to those in related art that various changes or modifications can be made therein without departing from the concept and the scope of the present invention.

The present application contains subject matter related to that disclosed in Japanese Patent Application 2008-070271 filed in the Japan Patent Office on Mar. 18, 2008, the entire content of which is hereby incorporated by reference.

Industrial Applicability

The present invention has advantages in that the advantages of both the centralized control and the distributed control can be selectively utilized while a time needed for cell searching is suppressed. Accordingly, the present invention is useful as a wireless communication apparatus that relays a base station and a mobile station or the like.

The invention claimed is:

1. A wireless communication apparatus for relaying communication between a base station and a mobile station that performs symbol synchronization by using a P-SCH (Primary Synchronization Channel), performs frame synchronization by using a S-SCH (Secondary Synchronization Channel), and receives and demodulates/decodes a P-BCH (Primary Broadcast Channel) at the time of cell searching, by using a centralized control resource and a distributed control resource, wherein the P-BCH, the S-SCH, and the P-SCH for the centralized control are transmitted to the centralized control resource, and the P-BCH and the S-SCH for the distributed control are transmitted to the distributed control resource, wherein, in a case where the centralized control resource and the distributed control resource are frequency-divided, the P-BCH and the S-SCH for the centralized control are transmitted to the centralized control resource, and the P-BCH and the S-SCH for the distributed control are transmitted to the distributed control resource, and wherein a scrambling code used in the S-SCH for the distributed control is calculated from a scrambling code used for the S-SCH for the centralized control and an index $\alpha$ that represents a distance between the resource to which the S-SCH for the distributed control is transmitted and the resource to which the S-SCH for the centralized control is transmitted.

2. A wireless communication apparatus for relaying communication between a base station and a mobile station that performs symbol synchronization by using a P-SCH (Primary Synchronization Channel), performs frame synchronization by using a S-SCH (Secondary Synchronization Channel), and receives and demodulates/decodes a P-BCH (Primary Broadcast Channel) at the time of cell searching, by using a centralized control resource and a distributed control resource,     wherein the P-BCH, the S-SCH, and the P-SCH for the centralized control are transmitted to the centralized control resource, and the P-BCH and the S-SCH for the distributed control are transmitted to the distributed control resource,     wherein, in a case where the centralized control resource and the distributed control resource are frequency-divided, the P-BCH and the S-SCH for the centralized control and the P-BCH and the S-SCH for the distributed control are transmitted to the centralized control resource in a time divisional process, and     wherein a scrambling code used in the S-SCH for the distributed control is calculated from a scrambling code used for the S-SCH for the centralized control and an index $\alpha$ that represents a distance between the resource to which the S-SCH for the distributed control is transmitted and the resource to which the S-SCH for the centralized control is transmitted.

* * * * *